(12) United States Patent
Weng et al.

(10) Patent No.: US 9,041,376 B2
(45) Date of Patent: May 26, 2015

(54) SYNCHRONOUS DC-DC CONVERTER HAVING SOFT-STOP FUNCTION

(71) Applicant: Anpec Electronics Corporation, Hsin-Chu (TW)

(72) Inventors: Chia-Chieh Weng, Nantou County (TW); Po-Hsueh Kuo, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 277 days.

(21) Appl. No.: 13/757,844

(22) Filed: Feb. 3, 2013

(65) Prior Publication Data

US 2014/0152287 A1 Jun. 5, 2014

(30) Foreign Application Priority Data

Dec. 5, 2012 (TW) .............................. 101145689 A

(51) Int. Cl.
*H02M 1/36* (2007.01)
*H02M 3/158* (2006.01)
*H02M 3/156* (2006.01)

(52) U.S. Cl.
CPC .............. *H02M 3/1588* (2013.01); *H02M 1/36* (2013.01); *Y02B 70/1466* (2013.01)

(58) Field of Classification Search
CPC ....... H02M 3/155; H02M 1/36; H02M 3/156; H02M 3/157

USPC .................................. 323/282, 283, 284, 285
See application file for complete search history.

(56) References Cited

U.S. PATENT DOCUMENTS

| 5,821,740 | A | * | 10/1998 | Hodgins et al. ................ 323/277 |
| 5,986,902 | A | * | 11/1999 | Brkovic et al. .................. 363/50 |
| 7,855,864 | B2 | * | 12/2010 | Andruzzi et al. ............ 361/91.1 |
| 7,880,455 | B2 | * | 2/2011 | Wu ................................. 323/284 |
| 2011/0122664 | A1 | | 5/2011 | Yabuzaki |
| 2012/0049829 | A1 | * | 3/2012 | Murakami ..................... 323/288 |

FOREIGN PATENT DOCUMENTS

TW 200742268 11/2007

* cited by examiner

*Primary Examiner* — Gary L Laxton
(74) *Attorney, Agent, or Firm* — Winston Hsu; Scott Margo

(57) ABSTRACT

A synchronous DC-DC converter having a soft-stop function includes an output stage for supplying an output voltage, wherein the output stage includes a high-side transistor for charging the output voltage and a low-side transistor for discharging the output voltage; an output control circuit, coupled to the output stage, for controlling the high-side transistor and the low-side transistor of the output stage; at least one protection device, for controlling the high-side transistor to be turned off when a specific situation occurs, in order to stop supplying the output voltage; and a soft-stop control circuit, coupled to the output control circuit, for controlling the low-side transistor of the output stage to be turned on when the protection device controls the high-side transistor to be turned off or the synchronous DC-DC converter is disabled, in order to discharge the output voltage.

15 Claims, 5 Drawing Sheets

SYNCHRONOUS DC-DC CONVERTER HAVING SOFT-STOP FUNCTION

BACKGROUND OF THE INVENTION

1. Field of the Invention

The present invention relates to a synchronous DC-DC converter, and more particularly, to a synchronous DC-DC converter having a soft-stop function capable of controlling an output voltage to be discharged slowly and smoothly when the synchronous DC-DC converter is disabled or when a protection circuit activates a protection mode.

2. Description of the Prior Art

A DC-DC converter can provide a flexible voltage conversion and a stable output voltage. Since the DC-DC converter has superior power conversion efficiency, it has been widely applied in many kinds of electronic systems as a power supply. According to system requirements for various voltage applications, the DC-DC converter can be divided into buck converters, boost converters and buck-boost converters.

Please refer to FIG. 1, which is a schematic diagram of a conventional synchronous DC-DC converter 10. The synchronous DC-DC converter 10 is substantially divided into an output stage 100 and a control circuit 110, and is utilized for supplying power to a load 120. The output stage 100 includes a high-side transistor 102, a low-side transistor 104, an inductor L1 and a capacitor C1. The high-side transistor 102, coupled between a power input terminal VDD and the inductor L1, is utilized for providing a charging current path, in order to charge an output voltage $V_{out}$. The low-side transistor 104, coupled between a ground terminal GND and the inductor L1, is utilized for providing a discharging current path, in order to discharge the output voltage $V_{out}$. The inductor L1 and the capacitor C1 are utilized for stabilizing the output voltage $V_{out}$ and storing output power. The control circuit 110 is utilized for controlling the high-side transistor 102 and the low-side transistor 104 to be turned on and off via control signals UG and LG, respectively. The industry has developed many controlling methods to implement the control circuit 110, e.g. current mode control or voltage mode control, etc. This allows currents with various magnitudes to be provided according to the load 120.

An ideal DC-DC converter can supply a stable output voltage under various loading condition. Since the synchronous DC-DC converter 10 has to provide enough current to adapt itself to the load 120 with various magnitudes, however, the high-side transistor 102 and the low-side transistor 104 always need to be extremely large transistors (at least to the order of hundreds or thousands of the magnitude of a smallest unit of transistor). When the synchronous DC-DC converter 10 is enabled, the control signal UG may control the high-side transistor 102 to be turned on. During the on-time, the output voltage $V_{out}$ rises fast and drives the output current to an extremely large value, which may cause the high-side transistor 102 or elements in the load 120 to be burnt out. The industry has developed a soft-start method which controls the output voltage $V_{out}$ to rise slowly, in order to avoid these large instant currents. When the synchronous DC-DC converter 10 is disabled, or an abnormal situation occurs to make a protection circuit activate a protection mode, however, the high-side transistor 102 and the low-side transistor 104 will be turned off simultaneously; hence the current is discharged via the load 120, to make the output voltage $V_{out}$ fall to a zero-voltage level. As mentioned above, the synchronous DC-DC converter 10 must be adapted to various magnitudes of the load 120, such that different statuses of the load 120 may correspond to different discharging situations. With heavy loads, the current can be discharged via the load 120, but with light loads, the current discharged via the load 120 is extremely small or even close to zero. This results in the output voltage $V_{out}$ falling extremely slowly or even remaining at the original voltage without falling. In such a condition, if the synchronous DC-DC converter 10 is applied in a case where voltage detection should be performed, when the synchronous DC-DC converter 10 is disabled and the output voltage has to be zero, if the output voltage $V_{out}$ is not fully discharged, errors may occur in voltage detection. Therefore, there is a need for improvement of the prior art.

SUMMARY OF THE INVENTION

It is an objective of the present invention to provide a synchronous DC-DC converter having a soft-stop function capable of controlling an output voltage to be discharged slowly and smoothly when the synchronous DC-DC converter is disabled or a protection circuit activates a protection mode.

The present invention discloses a synchronous DC-DC converter having a soft-stop function. The synchronous DC-DC converter comprises an output stage for supplying an output voltage, wherein the output stage comprises a high-side transistor for charging the output voltage and a low-side transistor for discharging the output voltage; an output control circuit, coupled to the output stage, for controlling the high-side transistor and the low-side transistor of the output stage; at least one protection device, for controlling the high-side transistor to be turned off when a specific situation occurs, in order to stop supplying the output voltage; and a soft-stop control circuit, coupled to the output control circuit, for controlling the low-side transistor of the output stage to be turned on when the protection device controls the high-side transistor to be turned off or the synchronous DC-DC converter is disabled, in order to discharge the output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
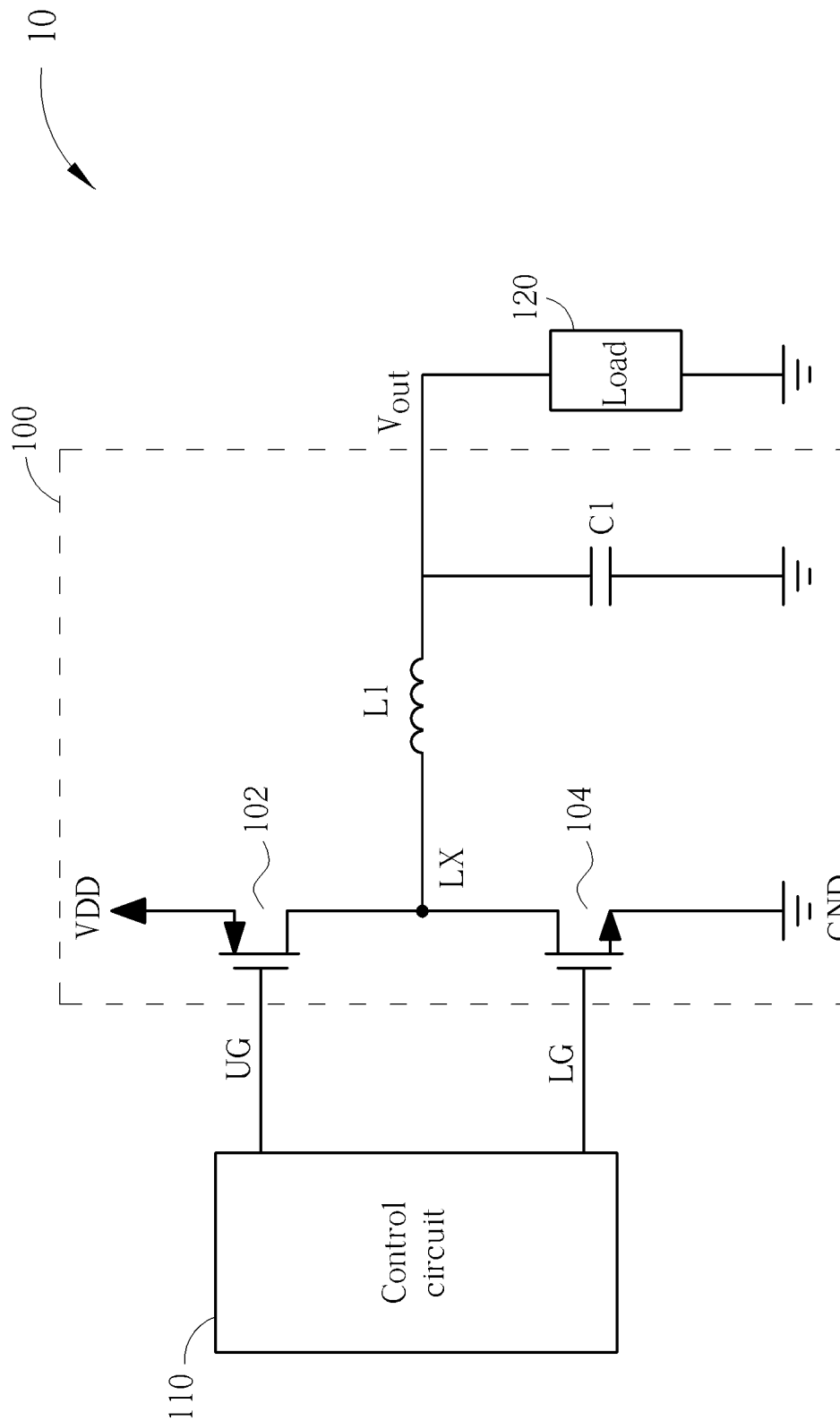
FIG. 1 is a schematic diagram of a conventional synchronous DC-DC converter.
Figure 2:
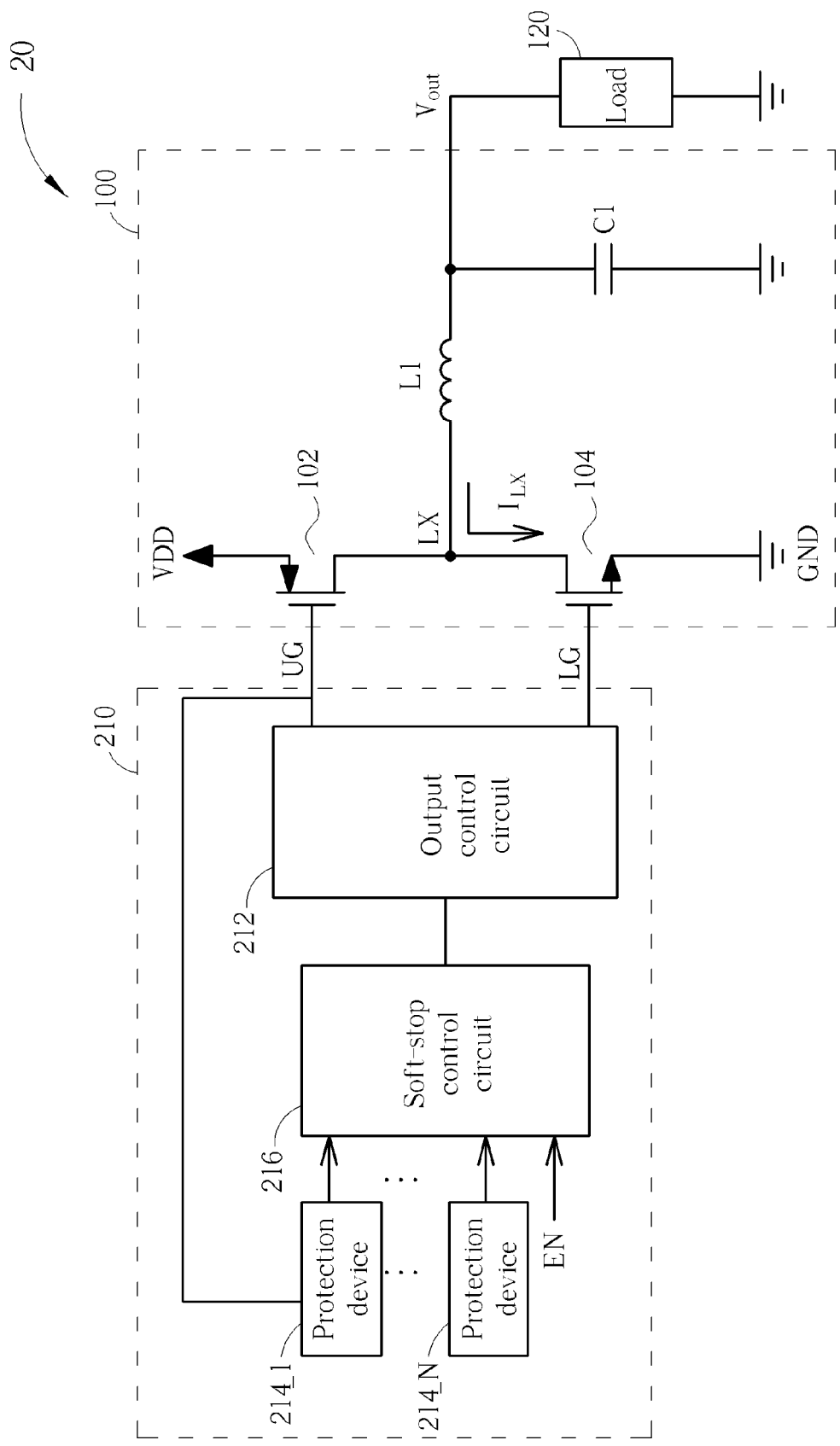
FIG. 2 is a schematic diagram of a synchronous DC-DC converter according to an embodiment of the present invention.

Please refer to FIG. 2, which is a schematic diagram of a synchronous DC-DC converter 20 according to an embodiment of the present invention. As shown in FIG. 2, structure of the synchronous DC-DC converter 20 is similar to that of the synchronous DC-DC converter 10 shown in FIG. 1; hence elements and signals with the same or similar functions are denoted by the same symbols. The main difference between the synchronous DC-DC converter 20 and the synchronous DC-DC converter 10 is that the synchronous DC-DC converter 20 has a control circuit 210 including an output control circuit 212, protection devices 214_1-214_N and a soft-stop control circuit 216.

The output control circuit 212, coupled to the output stage 100, is capable of outputting the control signals UG and LG for controlling the high-side transistor 102 and the low-side transistor 104 of the output stage 100, respectively. The protection devices 214_1-214_N is utilized for protecting the synchronous DC-DC converter 20. When a specific abnormal situation occurs (e.g. over-temperature, over-current, over-voltage lockout or under-voltage lockout), the protection devices 214_1-214_N control the high-side transistor 102 to be turned off, in order to stop supplying the output voltage $V_{out}$. Each of the protection devices 214_1-214_N may perform one or more protection functions. The soft-stop control circuit 216, coupled to the output control circuit 212, is utilized for receiving signals from the protection devices 214_1-214_N and an enable signal EN, which is utilized for controlling the synchronous DC-DC converter 20 to be enabled or disabled. When the protection devices 214_1-214_N activates the protection mode and controls the high-side transistor 102 to be turned off, or the enable signal EN is turned off (i.e. the synchronous DC-DC converter 20 is disabled), the soft-stop control circuit 216 is notified simultaneously. At this moment, the soft-stop control circuit 216 starts to operate, for controlling the low-side transistor 104 of the output stage 100 to be turned on, in order to discharge the output voltage $V_{out}$.

When the protection devices 214_1-214_N detect an abnormal situation, the soft-stop control circuit 216 may utilize the output control circuit 212 to control the high-side transistor 102 to be turned off, in order to stop supplying the output current and protect the synchronous DC-DC converter 20. When the enable signal EN is turned off and disables the synchronous DC-DC converter 20, the high-side transistor 102 is also turned off, in order to stop supplying the output current. At this moment, the soft-stop control circuit 216 starts to operate. The soft-stop control circuit 216 may utilize the control signal LG for controlling the low-side transistor 104 to be turned on in order to discharge the output voltage $V_{out}$. If the soft-stop control circuit 216 keeps controlling the low-side transistor 104 to be turned on, the discharging current may be increased continuously until the output voltage $V_{out}$ is fully discharged (i.e. discharged to the zero-voltage level). Therefore, in one embodiment, the soft-stop control circuit 216 can control the low-side transistor 104 to be turned on or off in an intermittent manner, in order to discharge the output voltage $V_{out}$ intermittently, which prevents the low-side transistor 104 from being burnt out due to a large discharging current.

In some embodiments, the control circuit 210 may prevent the low-side transistor 104 from being burnt out due to over-current by further detecting the current flowing through the low-side transistor 104. A terminal LX shown in FIG. 2 is a node between the high-side transistor 102, the low-side transistor 104 and the inductor L1; a current $I_{LX}$ for charging or discharging the output voltage $V_{out}$ can be detected at the terminal LX. As a result, the control circuit 210 may determine the current flowing through the low-side transistor 104 by detecting the current $I_{LX}$, in order to prevent the low-side transistor 104 from being burnt out due to a large discharging current. In other embodiments, other methods can also be utilized for detecting the current flowing through the low-side transistor 104; these are not limited herein.

Figure 3:
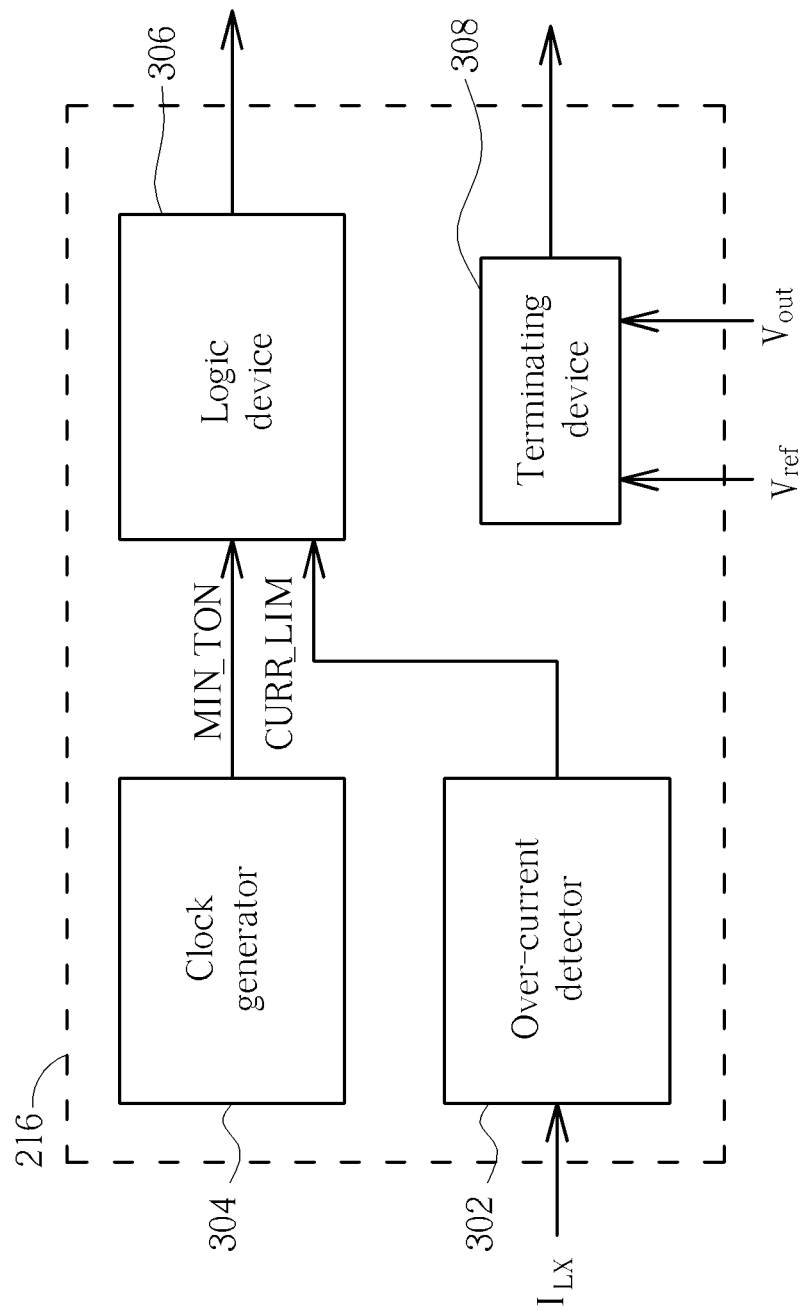
FIG. 3 is a schematic diagram of an embodiment of the soft-stop control circuit shown in FIG. 2.

Please refer to FIG. 3, which is a schematic diagram of an embodiment of the soft-stop control circuit 216 shown in FIG. 2. As shown in FIG. 3, the soft-stop control circuit 216 includes an over-current detector 302, a clock generator 304, a logic device 306 and a terminating device 308. The over-current detector 302 is utilized for detecting the current $I_{LX}$ flowing through the low-side transistor 104, and outputting an over-current signal CURR_LIM to indicate whether the current $I_{LX}$ is too large. The clock generator 304 is utilized for generating a control clock MIN_TON. The logic device 306, coupled to the over-current detector 302 and the clock generator 304, is utilized for controlling the low-side transistor 104 to be turned on or off in an intermittent manner according to the over-current signal CURR_LIM and the control clock MIN_TON.

In detail, when the logic device 306 receives a trigger from the control clock MIN_TON, the control signal LG is activated to control the low-side transistor 104 to be turned on so that the current $I_{LX}$ flowing from the terminal LX to the ground terminal GND starts to increase. When the current $I_{LX}$ reaches a threshold value, the over-current detector 302 detects an over-current status occurs and triggers the over-current signal CURR_LIM. At this moment, the logic device 306 receives a trigger from the over-current signal CURR_LIM, to control the low-side transistor 104 to be turned off, and then the current $I_{LX}$ reduces gradually. When the control clock MIN_TON triggers the logic device 306 again, the low-side transistor 104 is turned on again, such that the low-side transistor 104 can be turned on and off intermittently, in order to prevent itself from being burnt out due to the current $I_{LX}$ being too large. The terminating device 308 is utilized for detecting whether the output voltage $V_{out}$ is fully discharged, and terminates operations of the soft-stop control circuit 216 when the output voltage $V_{out}$ is fully discharged.

Figure 4:
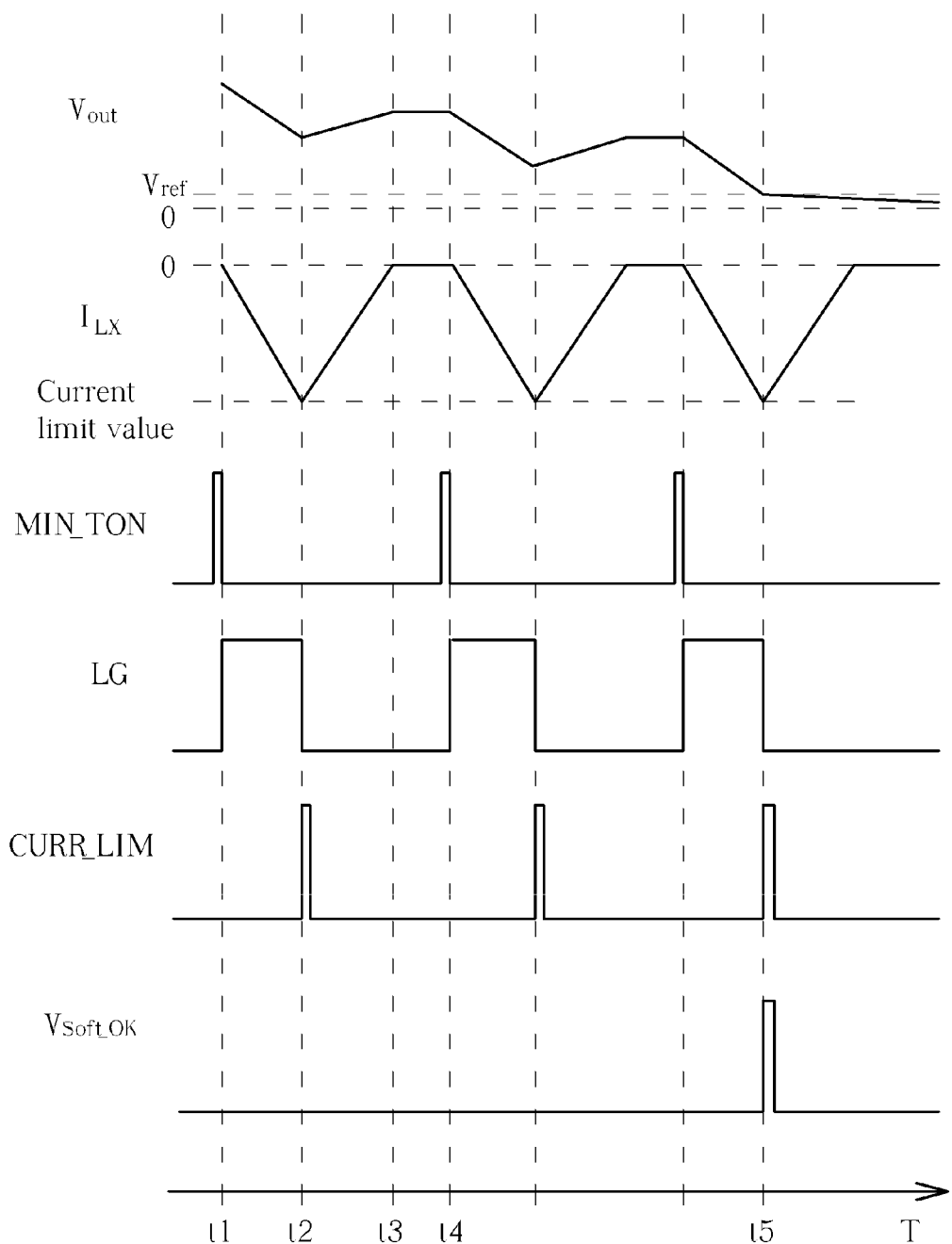
FIG. 4 is a waveform diagram of operations of the soft-stop control circuit.

As mentioned above, when detecting that the protection devices 214_1-214_N control the high-side transistor 102 to be turned off or the enable signal EN is turned off (i.e. the synchronous DC-DC converter 20 is disabled), the soft-stop control circuit 216 starts to operate. Detailed operations are illustrated in FIG. 4, which is a waveform diagram of the operations of the soft-stop control circuit 216. As shown in FIG. 4, after the soft-stop control circuit 216 starts to operate, at the moment of the control clock MIN_TON (outputted by the clock generator 304) being triggered (Time t1), the logic device 306 may utilize the control signal LG for controlling the low-side transistor 104 to be turned on, and the current $I_{LX}$ flowing through the low-side transistor 104 starts to increase, in order to discharge the output voltage $V_{out}$. Since the current $I_{LX}$ is the discharging current for reducing the output voltage $V_{out}$, the current $I_{LX}$ is illustrated as an inverse current in FIG. 4. Since the low-side transistor 104 is an N-type metal-oxide semiconductor (NMOS) transistor, the control signal LG is switched from a lower voltage level to a higher voltage level, in order to turn on the low-side transistor 104. In some embodiments, if the low-side transistor is a P-type metal-oxide semiconductor (PMOS) transistor, the control signal is switched from a higher voltage level to a lower voltage level, in order to turn on the low-side transistor; this is not limited herein.

During the discharging process, the over-current detector 302 may keep detecting the current $I_{LX}$ flowing through the low-side transistor 104, and output the over-current signal CURR_LIM. When the over-current detector 302 detects that the current $I_{LX}$ reaches a current limit value, a pulse is generated in the over-current signal CURR_LIM (Time t2). The logic device 306 receives a trigger from this pulse and controls the control signal LG to be switched from a higher voltage level to a lower voltage level, in order to control the low-side transistor 104 to be turned off, such that the current falls gradually. Since the current $I_{LX}$ flowing through the terminal LX may also flow through the inductor L1, the current $I_{LX}$ can not change instantly according to the characteristic of the inductor L1. Therefore, at the moment of the low-side transistor 104 being turned off, the current $I_{LX}$ cannot fall to zero instantly; instead, the current $I_{LX}$ falls gradually, and the falling speed is determined according to inductance of the inductor L1. At this moment, the output voltage $V_{out}$ may rise slightly, as shown in FIG. 4. After the current $I_{LX}$ falls to zero, the output voltage $V_{out}$ stops changing (Time t3). Until the logic device 306 receives another trigger from the control clock MIN_TON (Time t4), the low-side transistor 104 is turned on and the current $I_{LX}$ rises, in order to discharge the output voltage $V_{out}$. When the current $I_{LX}$ reaches the current limit value, the low-side transistor 104 is turned off again. As a result, the soft-stop control circuit 216 can discharge the output voltage $V_{out}$ intermittently, in order to prevent the low-side transistor 104 from being burnt out due to a large discharging current.

After the low-side transistor 104 performs several turn-on/turn-off operations, the output voltage $V_{out}$ may be fully discharged. The terminating device 308 is utilized for detecting whether the output voltage $V_{out}$ is fully discharged. For example, a reference voltage $V_{ref}$ can be utilized, and when the output voltage $V_{out}$ falls and reaches the reference voltage $V_{ref}$ (Time t5), the output voltage $V_{out}$ is determined to be fully discharged. At this moment, the terminating device 308 may control the low-side transistor 104 to be turned off, and terminate the operations of the soft-stop control circuit 216 (i.e. the low-side transistor 104 will not be turned on again). In some embodiments, the terminating device 308 may further output a soft-stop complete signal $V_{soft\_OK}$ to inform the system, or an external soft-stop complete signal $V_{soft\_OK}$ detects externally whether the soft-stop operation is accomplished. According to the above operations of the soft-stop control circuit 216, the current limit value for the current $I_{LX}$ and the cycle of the control clock MIN_TON can both be set arbitrarily, in order to adjust the discharging speed of the output voltage $V_{out}$, such that the output voltage $V_{out}$ can be discharged slowly and smoothly.

Figure 5:
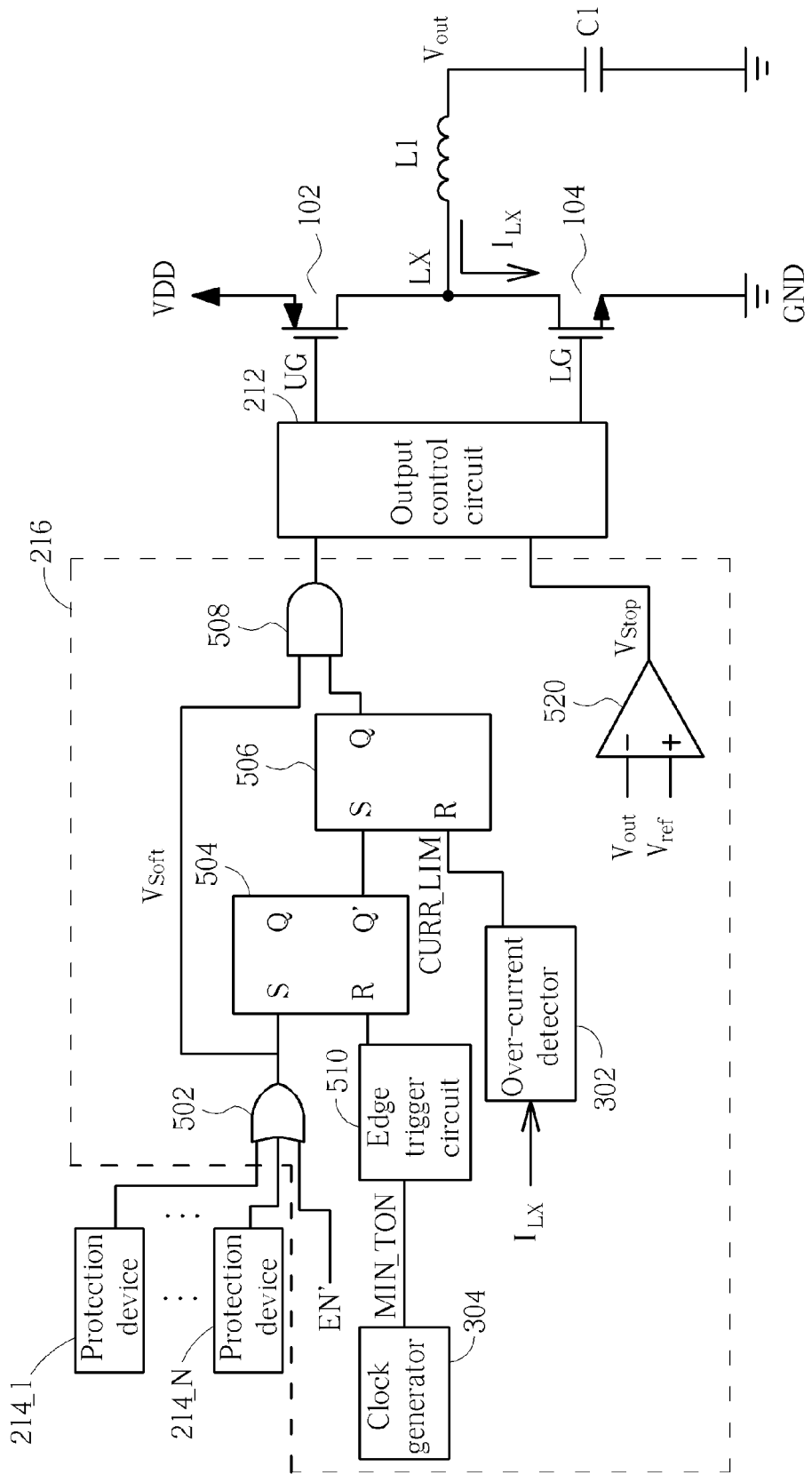
FIG. 5 is a schematic diagram of a specific embodiment of the soft-stop control circuit shown in FIG. 3.

One of the realizations of the soft-stop control circuit 216 shown in FIG. 3 and the waveforms shown in FIG. 4 is illustrated in FIG. 5, which is a schematic diagram of a specific embodiment of the soft-stop control circuit 216 shown in FIG. 3. As shown in FIG. 5, the logic device 306 can be realized by multiple logic circuits, which may include an OR-gate 502, SR-latches 504, 506 and an AND-gate 508. The OR-gate 502, coupled to the protection devices 214_1-214_N, receives an inverse enable signal EN' and outputs a soft-stop signal $V_{soft}$. When any one protection device 214_x activates the protection mode and controls the high-side transistor 102 to be turned off or the enable signal EN is turned off, the protection device 214_x may output a higher voltage signal or the inverse enable signal EN' is switched to a higher voltage level, such that the soft-stop signal $V_{soft}$ is switched to a higher voltage level. The S input terminal of the SR-latch 504 receives the soft-stop signal $V_{soft}$, and the R input terminal of the SR-latch 504 receives the trigger from the control clock MIN_TON via an edge trigger circuit 510. As the waveforms in FIG. 4 show, the SR-latch 504 is triggered at the negative edges of the control clock MIN_TON, but in some embodiments, the SR-latch 504 may also be triggered at the positive edges of the control clock MIN_TON. In addition, the duty cycle of the control clock MIN_TON may also be defined arbitrarily according to system requirements, which are not limited herein. The S input terminal of the SR-latch 506 is coupled to the Q' output terminal of the SR-latch 504. When the control clock MIN_TON triggers the SR-latch 504, the control clock MIN_TON also triggers the SR-latch 506, such that the Q output terminal of the SR-latch 506 outputs a higher voltage signal. The AND-gate 508 receives both the higher voltage signal and the soft-stop signal $V_{soft}$, in order to output another higher voltage signal for triggering the control circuit 110, which in turn controls the control signal LG to be switched from a lower voltage level to a higher voltage level, such that the low-side transistor 104 will be turned on. The R input terminal of the SR-latch 506 is coupled to the over-current detector 302. When the over-current detector 302 detects that the over-current occurs, the SR-latch 506 is triggered by the over-current signal CURR_LIM, such that the Q output terminal of the SR-latch 506 outputs a lower voltage signal. When the AND-gate 508 receives this lower voltage signal, the AND-gate 508 may output another lower voltage signal to trigger the control circuit 110, in order to control the control signal LG to be switched from a higher voltage level to a lower voltage level, such that the low-side transistor 104 will be turned off. As a result, the soft-stop control circuit 216 can discharge the output voltage $V_{out}$ intermittently, in order to control the output voltage $V_{out}$ to be discharged slowly and smoothly, and prevent the low-side transistor 104 from being burnt out due to the current $I_{LX}$ being too large.

The terminating device 308 can be realized by a comparator 520. As shown in FIG. 5, both input terminals of the comparator 520 receive the output voltage $V_{out}$ and the reference voltage $V_{ref}$, respectively, in order to compare the magnitudes of the output voltage $V_{out}$ and the reference voltage $V_{ref}$. When the soft-stop control circuit 216 starts to operate, if the output voltage $V_{out}$ is greater than the reference voltage $V_{ref}$, the output voltage $V_{out}$ is not fully discharged. At this moment, the soft-stop control circuit 216 keeps discharging the output voltage $V_{out}$ intermittently. When the output voltage $V_{out}$ is less than the reference voltage $V_{ref}$, the output voltage $V_{out}$ is fully discharged. At this moment, the comparator 520 outputs a terminating signal $V_{stop}$ to trigger the control circuit 110, in order to control the control signal LG to be switched from a higher voltage level to a lower voltage level, such that the low-side transistor 104 will be turned off, and the operations of the soft-stop control circuit 216 will be terminated (i.e. the low-side transistor 104 will not be turned on again).

Please note that the spirit of the present invention is to control the output voltage to be discharged slowly and smoothly when the synchronous DC-DC converter is disabled or any of the protection circuits activates the protection mode. Those skilled in the art can make modifications and alterations accordingly. For example, the circuit shown in FIG. 5 is only an embodiment capable of realizing the above discharging method, and those skilled in the art can arbitrarily adjust or modify the circuit structure in FIG. 5 according to system requirements. For example, in the logic device 306, the SR-latches 504 and 506 may both be replaced by other types of latches or flip-flops, and the accompanying OR-gate 502 and AND-gate 508 may also be replaced by different types of logic gates such as OR-gate, AND-gate, NOR gate, NAND gate, exclusive-OR gate, exclusive-NOR gate, etc. The logic device 306 may also include any numbers of latches (or flip-flops) together with any numbers of logic gates, in order to perform various connections and arrangements according to system requirements, which is not limited herein. Those skilled in the art should know that any variation generated by different connections and arrangements of any kinds of circuit devices are all included in the scope disclosed by the present invention, as long as the circuit can realize a slow and smooth discharging. As mentioned above, the SR-latch 504 may be triggered by the control clock MIN_TON at the negative edges or the positive edges. Similarly, the SR-latch 506 may also be designed to be triggered at the negative edges or the positive edges of the over-current signal CURR_LIM, which is not limited herein. In addition, the above synchronous DC-DC converter 20 shown in FIG. 2 and FIG. 5 is a buck synchronous DC-DC converter, but in other embodiments, the above method of controlling the output voltage to be discharged slowly and smoothly can also be applied in other types of synchronous DC-DC converters, e.g. boost synchronous DC-DC converters or buck-boost synchronous DC-DC converters, and are not limited herein.

In the prior art, when the synchronous DC-DC converter is operated with heavy loads, the current can be discharged via the load; but when the synchronous DC-DC converter is operated with light loads, the current discharged via the load is extremely small or even close to zero; hence the output voltage falls extremely slowly, or even remains at the original voltage without falling. If the synchronous DC-DC converter is applied in a case where voltage detection should be performed, when the synchronous DC-DC converter is disabled and the output voltage has to be zero, if the output voltage is not fully discharged, errors may occur in voltage detection. In comparison, the present invention provides a synchronous DC-DC converter having a soft-stop function, which is capable of controlling an output voltage to be discharged slowly and smoothly by using a soft-stop control circuit when the synchronous DC-DC converter is disabled or a protection circuit activates a protection mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous DC-DC converter having a soft-stop function, comprising:
    an output stage, for supplying an output voltage, the output stage comprising:
        a high-side transistor, for charging the output voltage; and
        a low-side transistor, for discharging the output voltage;
    an output control circuit, coupled to the output stage, for controlling the high-side transistor and the low-side transistor of the output stage;
    at least one protection device, for controlling the high-side transistor to be turned off when a specific situation occurs, in order to stop supplying the output voltage; and
    a soft-stop control circuit, coupled to the output control circuit, for controlling the low-side transistor of the output stage to be turned on when the protection device controls the high-side transistor to be turned off or the synchronous DC-DC converter is disabled, in order to discharge the output voltage, wherein the soft-stop control circuit comprises:
        an over-current detector, for detecting a current flowing through the low-side transistor;
        a clock generator, for generating a control clock;
        a logic device, coupled to the over-current detector and the clock generator, for controlling the low-side transistor to be turned off when the current flowing through the low-side transistor exceeds a predefined current, and periodically controls the low-side transistor to be turned on according to the control clock; and
        a terminating device, for controlling the low-side transistor to be turned off when the output voltage is lower than a predefined voltage, and for terminating operations of the soft-stop control circuit.

2. The synchronous DC-DC converter of claim 1, wherein the specific situation comprises over-current, over-temperature, over-voltage lockout and under-voltage lockout.

3. The synchronous DC-DC converter of claim 1, wherein the soft-stop control circuit controls the low-side transistor of the output stage to be turned on and off in an intermittent manner, in order to discharge the output voltage intermittently.

4. The synchronous DC-DC converter of claim 1, wherein the terminating device comprises a comparator, for comparing the output voltage and the predefined voltage.

5. The synchronous DC-DC converter of claim 1, wherein the logic device comprises:
    a first logic circuit, coupled to the protection device, for generating a soft-stop signal when the protection device controls the high-side transistor to be turned off or the synchronous DC-DC converter is disabled, in order to activate the soft-stop control circuit;
    a second logic circuit, coupled to the clock generator, for receiving a trigger from the control clock, in order to control the low-side transistor to be turned on periodically; and
    a third logic circuit, coupled to the over-current detector, for controlling the low-side transistor to be turned off when the current flowing through the low-side transistor exceeds a predefined current.

6. The synchronous DC-DC converter of claim 5, wherein the first logic circuit comprises an OR-gate.

7. The synchronous DC-DC converter of claim 5, wherein the second logic circuit is further coupled to the first logic circuit, for receiving a trigger from the soft-stop signal.

8. The synchronous DC-DC converter of claim 7, wherein the third logic circuit is further coupled to the second logic circuit, for receiving a trigger from an output signal of the second logic circuit.

9. The synchronous DC-DC converter of claim 5, wherein the second logic circuit comprises an SR-latch.

10. The synchronous DC-DC converter of claim 5, wherein the third logic circuit comprises an SR-latch.

11. The synchronous DC-DC converter of claim 5, wherein the logic device further comprises a fourth logic circuit coupled to the first logic circuit and the third logic circuit, for receiving the soft-stop signal and an output signal of the third logic circuit, in order to control the output control circuit.

12. The synchronous DC-DC converter of claim 11, wherein the fourth logic circuit comprises an AND-gate.

13. The synchronous DC-DC converter of claim 1, wherein the step of the logic device periodically controlling the low-side transistor to be turned on according to the control clock comprises the logic device controlling the low-side transistor to be turned on at each positive edge of the control clock.

14. The synchronous DC-DC converter of claim 1, wherein the step of the logic device periodically controlling the low-side transistor to be turned on according to the control clock comprises the logic device controlling the low-side transistor to be turned on at each negative edge of the control clock.

15. The synchronous DC-DC converter of claim 1, wherein the output stage further comprises:
    a capacitor, coupled between an output terminal and a ground terminal, for storing power of the output voltage and stabling the output voltage; and
    an inductor, coupled between the high-side transistor, the low-side transistor and the output terminal.

* * * * *